(12) United States Patent
Kang et al.

(10) Patent No.: US 10,921,460 B2
(45) Date of Patent: Feb. 16, 2021

(54) POSITION ESTIMATING APPARATUS AND METHOD

(71) Applicant: Samsung Electronics Co., Ltd., Suwon-si (KR)

(72) Inventors: Chul Woo Kang, Seoul (KR); Kyungboo Jung, Seoul (KR); Hwiryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 15/905,138

(22) Filed: Feb. 26, 2018

(65) Prior Publication Data

US 2019/0113629 A1    Apr. 18, 2019

(30) Foreign Application Priority Data

Oct. 16, 2017  (KR) .......................... 10-2017-0133955

(51) Int. Cl.
| | | |
|---|---|---|
| *G01S 19/40* | (2010.01) | |
| *G01S 19/48* | (2010.01) | |
| *G01S 19/49* | (2010.01) | |
| *G01S 19/45* | (2010.01) | |
| *G01S 19/06* | (2010.01) | |
| *G01S 19/08* | (2010.01) | |
| *G01S 19/47* | (2010.01) | |

(52) U.S. Cl.
CPC .............. *G01S 19/40* (2013.01); *G01S 19/06* (2013.01); *G01S 19/08* (2013.01); *G01S 19/45* (2013.01); *G01S 19/47* (2013.01); *G01S 19/48* (2013.01); *G01S 19/49* (2013.01)

(58) Field of Classification Search
CPC .......... G01S 19/40; G01S 19/06; G01S 19/08; G01S 19/45; G01S 19/47; G01S 19/48; G01S 19/49
See application file for complete search history.

(56) References Cited

U.S. PATENT DOCUMENTS

| | | |
|---|---|---|
| 7,219,013 B1 | 5/2007 | Young et al. |
| 9,031,782 B1 | 5/2015 | Lemay et al. |
| 9,270,952 B2 | 2/2016 | Jamtgaard et al. |
| 9,494,694 B1 | 11/2016 | Dong et al. |
| 9,618,351 B1 | 4/2017 | Mahapatra |
| 2005/0031167 A1 | 2/2005 | Hu et al. |
| 2007/0233336 A1 | 10/2007 | Serguei et al. |

(Continued)

FOREIGN PATENT DOCUMENTS

| | | |
|---|---|---|
| JP | 2009-121945 A | 6/2009 |
| KR | 10-2009-0066776 A | 6/2009 |

(Continued)

OTHER PUBLICATIONS

Extended European Search Report dated Dec. 4, 2018 in corresponding European Patent Application No. 18176070.3 (8 pages in English).

*Primary Examiner* — Erin F Heard
*Assistant Examiner* — Donald H B Braswell
(74) *Attorney, Agent, or Firm* — NSIP Law

(57) ABSTRACT

Disclosed is a position estimating method and apparatus that estimates a position based on main sensing data and secondarily determines the position based on the main sensing data and auxiliary sensing data when the auxiliary sensing data is found to be reliable.

22 Claims, 10 Drawing Sheets

(56) References Cited

U.S. PATENT DOCUMENTS

| | | |
|---|---|---|
| 2009/0292468 A1 | 11/2009 | Wu et al. |
| 2012/0203519 A1 | 8/2012 | Louis et al. |
| 2012/0290146 A1 | 11/2012 | Dedes et al. |
| 2015/0363706 A1 | 12/2015 | Huber et al. |
| 2016/0140729 A1 | 5/2016 | Soatto et al. |
| 2016/0273921 A1* | 9/2016 | Zhou .................. G01S 19/49 |
| 2017/0031032 A1 | 2/2017 | Garin et al. |
| 2017/0102467 A1* | 4/2017 | Nielsen ............... G01S 19/49 |
| 2018/0025632 A1* | 1/2018 | Breed ................ G08G 1/0112 |
| | | 701/93 |

FOREIGN PATENT DOCUMENTS

| | | |
|---|---|---|
| KR | 10-1454824 B1 | 11/2014 |
| WO | WO 2011/120141 A1 | 10/2011 |
| WO | WO 2015/085483 A1 | 6/2015 |

\* cited by examiner

POSITION ESTIMATING APPARATUS AND METHOD

CROSS-REFERENCE TO RELATED APPLICATIONS

This application claims the benefit under 35 USC § 119(a) of Korean Patent Application No. 10-2017-0133955 filed on Oct. 16, 2017 in the Korean Intellectual Property Office, the entire disclosure of which is incorporated herein by reference for all purposes.

BACKGROUND

1. Field

The following description relates to position estimation technology.

2. Description of Related Art

A vehicle navigation apparatus receives a radio wave from satellites belonging to a plurality of global navigation satellite systems (GNSSs) to verify a current position and a velocity of a moving vehicle. As such, a vehicle navigation apparatus may three-dimensionally calculate the current position of the vehicle including latitude, longitude, and attitude information based on information received in a GNSS receiver. In some instances, a GNSS signal includes a GNSS position error within a range from about 10 to 100 meters (m). Such an error may be corrected by other sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a position estimating method performed by a processor, the method including estimating a position of a target based on main sensing data acquired from a main sensor, verifying a reliability of auxiliary sensing data acquired from an auxiliary sensor, and determining the position of the target based on the main sensing data and the auxiliary sensing data, in response to the auxiliary sensing data being found to be reliable.

The estimating of the position of the target may include applying a nonlinear filtering on the main sensing data to compensate for a positioning error.

The position estimating method may include acquiring a global positioning system (GPS) signal and an inertial measurement unit (IMU) signal indicating an acceleration and an angular velocity of a target as the main sensing data.

The position estimating method may include determining the position of the target estimated based on the main sensing data to be a position of the target, in response to the auxiliary sensing data being found to be unreliable.

The verifying of the reliability of the auxiliary sensing data may include acquiring image data in front of the target from the auxiliary sensor, and determining a reliability of the image data.

The position estimating method may include excluding auxiliary sensing data during a current time interval, in response to the auxiliary sensing data collected during the current time interval being found to be unreliable.

The verifying of the reliability of the auxiliary sensing data may include calculating a reliability score of the auxiliary sensing data, determining that the auxiliary sensing data to be reliable in response to the calculated reliability score being greater than a threshold score, and determining that the auxiliary sensing data to be unreliable in response to the calculated reliability score being less than or equal to the threshold score.

The verifying of the reliability of the auxiliary sensing data may include determining the reliability of the auxiliary sensing data based on the main sensing data.

The verifying of the reliability of the auxiliary sensing data may include calculating any one or any combination of a difference between position information obtained from the main sensing data and position information obtained from the auxiliary sensing data, a difference between velocity information obtained from the main sensing data and velocity information obtained from the auxiliary sensing data, and a difference between attitude information obtained from the main sensing data and attitude information obtained from the auxiliary sensing data, and determining the reliability of the auxiliary sensing data based on any one or any combination of the differences.

The position estimating method may include collecting other auxiliary sensing data from a plurality of auxiliary sensors, wherein the verifying of the reliability of the auxiliary sensing data may include calculating a reliability score of the auxiliary sensing data and each of the other auxiliary sensing data, and the determining of the position of the target comprises determining the position of the target based on the main sensing data and a sensing data with a greatest reliability score among the auxiliary sensing data and the each of the other auxiliary sensing data.

The position estimating method may include verifying a reliability of an additional sensing data acquired from an additional sensor, and determining the position of the target based on the additional sensing data, the auxiliary sensing data, and the main sensing data in response to the additional sensing data being found to be reliable.

The position estimating method may include selecting an output mode for the position of the target based on the reliability of the auxiliary sensing data, wherein the selecting of the output mode may include outputting the position estimated based on the main sensing data, in response to the auxiliary sensor representing a reliability score less than or equal to a threshold score, and outputting the determined position based on the main sensing data and the auxiliary sensing data, in response to the auxiliary sensor representing a reliability score greater than the threshold score.

In another general aspect, there is provided position estimating apparatus including a sensor configured to generate main sensing data and auxiliary sensing data, and a processor configured to estimate a position of a target based on the main sensing data, to verify a reliability of the auxiliary sensing data, and to determine the position of the target based on the main sensing data and the auxiliary sensing data, in response to the auxiliary sensing data being found to be reliable.

The processor may be configured to apply a nonlinear filtering on the main sensing data to compensate for a positioning error.

The sensor may include a main sensor configured to acquire a global positioning system (GPS) signal and an inertial measurement unit (IMU) signal indicating an acceleration and an angular velocity of a target as the main sensing data.

The processor may be configured to determine the position of the target estimated based on the main sensing data to be a position of the target, in response to the auxiliary sensing data being found to be unreliable.

The sensor may include an auxiliary sensor configured to acquire image data in front of the target.

The processor may be configured to exclude the collected auxiliary sensing data during a current time interval, in response to auxiliary sensing data collected during the current time interval being found to be unreliable.

The processor may be configured to calculate a reliability score of the auxiliary sensing data, to determine that the auxiliary sensing data is reliable in response to the calculated reliability score being greater than a threshold score, and to determine that the auxiliary sensing data is unreliable in response to the calculated reliability score being less than or equal to the threshold score.

The main sensing data and the auxiliary sensing date may be generated from a plurality of sensors, and the processor is further configured to determine the position of the target by fusing sensing data at an optimized ratio based on a performance of each of the plurality of sensors using Kalman filtering.

The processor may be configured to determine the position of the target by selectively using the auxiliary sensing data having a lower reliability and a higher accuracy in comparison to the main sensing data.

The sensor may include a main sensor including at least one of a global positioning system (GPS) sensor or an inertial measurement unit (IMU) sensor, an auxiliary sensor including at least a camera, and an additional sensor including at least one of an odometer, a velocity meter, a light detection and ranging (LIDAR) sensor, or a radio detection and ranging (RADAR) sensor.

In another general aspect, there is provided a position estimating apparatus including a sensor configured to generate main sensing data and auxiliary sensing data, a touch-sensitive display, a memory configured to store instructions, a processor configured to execute the instructions to receive the main sensing data and the auxiliary sensing data, estimate a position of a target based on the main sensing data, verify a reliability of the auxiliary sensing data, determine the position of the target based on the main sensing data and the auxiliary sensing data, in response to the auxiliary sensing data being found to be reliable, and output the position of the target to the display.

Other features and aspects will be apparent from the following detailed description, the drawings, and the claims.

Figure 1:
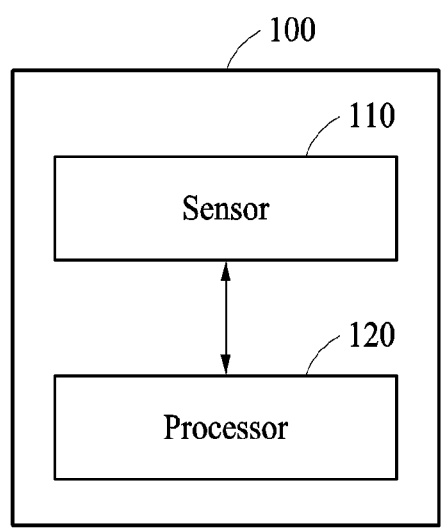
FIGS. 1 through 3 illustrate examples of a position estimating apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions may be omitted when it is deemed that such description will cause ambiguous interpretation of the present disclosure.

Figure 2:
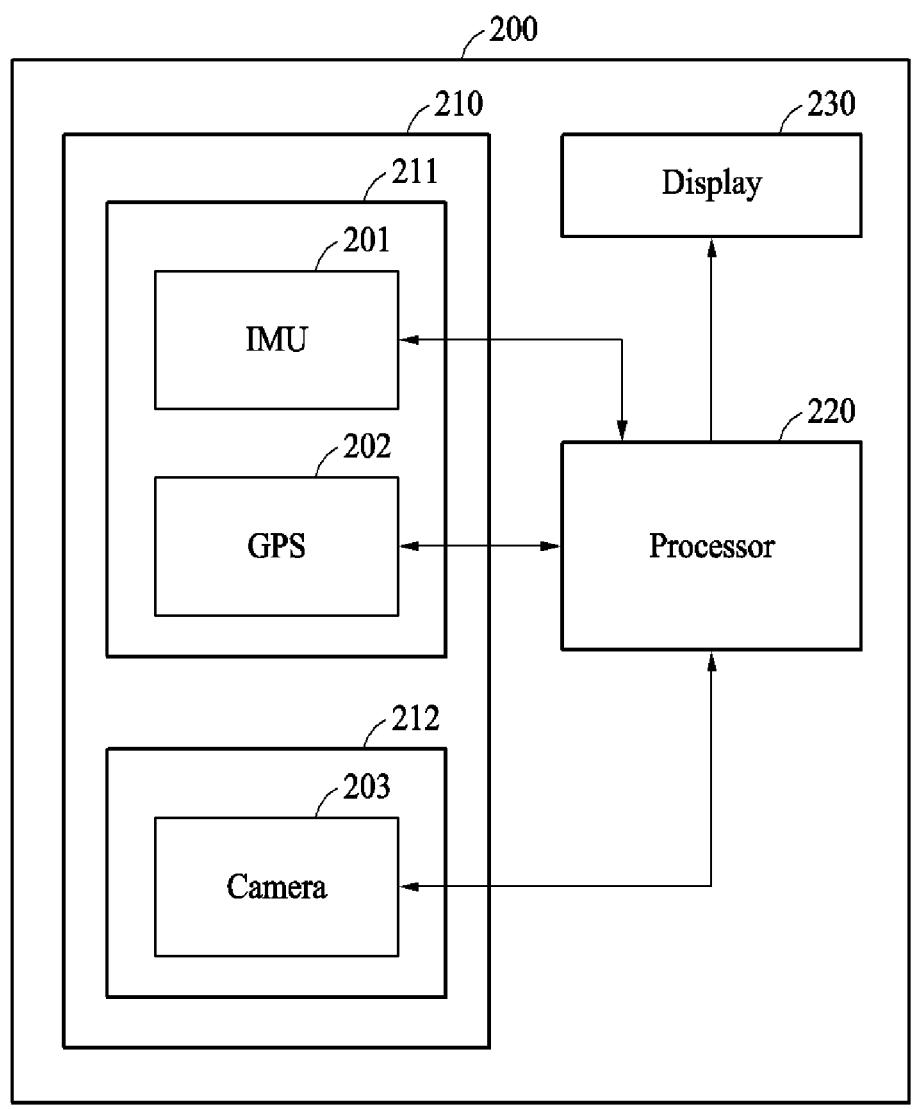
Figure 3:
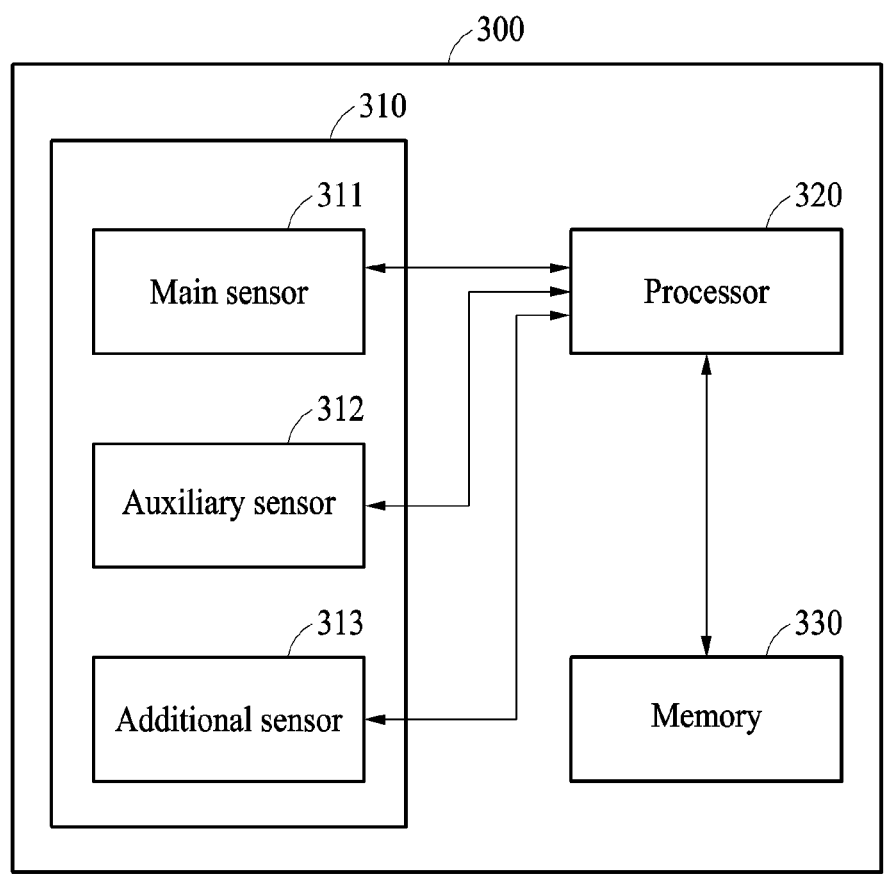

FIGS. 1 through 3 illustrate examples of a position estimating apparatus.

FIG. 1 illustrates a position estimating apparatus 100. The position estimating apparatus 100 includes a sensor 110 and a processor 120.

The sensor 110 generates main sensing data and auxiliary sensing data. For example, the sensor 110 acquires the main sensing data through a main sensor and acquires the auxiliary sensing data through an auxiliary sensor.

The processor 120 determines whether to use the auxiliary sensing data to determine a position of a target in addition to the main sensing data based on a reliability of the auxiliary sensing data. In an example, the processor 120 estimates the position of the target based on the main sensing data, and the processor 120 determines the reliability of the auxiliary sensing data. When the auxiliary sensing data is reliable, the processor 120 secondarily re-estimates the position of the target based on the auxiliary sensing data and the main sensing data.

In an example, the target is an apparatus including the position estimating apparatus 100. When the position estimating apparatus 100 is mounted on a vehicle, the target may be the vehicle. In an example, vehicle described herein refers to any mode of transportation, delivery, or communication such as, for example, an automobile, a truck, a tractor, a scooter, a motorcycle, a cycle, an amphibious vehicle, a snowmobile, a boat, a public transit vehicle, a bus, a monorail, a train, a tram, an autonomous or automated driving vehicle, an intelligent vehicle, a self-driving vehicle, an aircraft, an unmanned aerial vehicle, a drone, or a mobile device. In an example, the position estimating apparatus is applicable to a robot requiring a positioning operation.

The apparatus and methods described herein may be used to estimate a position of a target in a navigation system of a smart vehicle, to generate location information to assist an autonomous or automated driving vehicle in steering, for in-vehicle driving assistance for fully autonomous or automated driving, and thus, enable safer and more comfortable driving.

FIG. 2 illustrates a sensor 210 included in a position estimating apparatus 200.

The sensor 210 includes a main sensor 211 and an auxiliary sensor 212.

The main sensor 211 generates main sensing data. The main sensor 211 includes an inertial measurement unit (IMU) 201 and a global positioning system (GPS) module 202. The main sensor 211 acquires a GPS signal and an IMU signal indicating an acceleration and an angular velocity of a target as the main sensing data.

The IMU 201 is also referred to as an inertial measurer. The IMU 201 measures an attitude change, a velocity changing for positional movement, and a displacement. In an example, the IMU 201 includes a 3-axis accelerometer that senses a translational motion, for example, an acceleration and a 3-axis gyroscope that senses a rotational motion, for example, an angular velocity. Since the IMU 201 does not depend on external information, the IMU 201 may stably collect an acceleration signal and an angular velocity signal. The calculated position may diverge as a sensing time of the IMU 201 is accumulated. Thus, a processor 220 may fuse the IMU signal to the GPS signal and the image data to stably estimate the position.

In an example, the GPS module 202 receives signals transmitted from three or more artificial satellites and calculates positions of a satellite and the position estimating apparatus 200. In an example, the number of artificial satellites may be varied without departing from the spirit and scope of the illustrative examples described. The GPS module 202 is also referred to as, for example, a global navigation satellite system (GNSS).

The auxiliary sensor 212 generates auxiliary sensing data. In an example, the auxiliary sensor 212 includes a camera 203. The camera 203 captures an external view of the position estimating apparatus 200 to generate image data. A type of the auxiliary sensor 212 is not limited to the foregoing examples. A sensing module having a lower reliability and a higher preciseness in comparison to the main sensor 211 may also be implemented as the auxiliary sensor 212.

The processor 220 may operate similarly as described with reference to FIG. 1. The processor 220 receives an IMU signal from the IMU 201 and receives a GPS signal from the GPS module 202 to estimate a position of a target.

In an example, when auxiliary sensing data has relatively high accuracy and reliability, the processor 220 applies the auxiliary sensing data to position estimation. In an example, the processor 220 determines whether to apply image data to the position estimation based on a status of the image data.

When the auxiliary sensing data is the image data and has high reliability, the processor 220 collects visual information about the surroundings of a target based on the image data. The processor 220 corrects the estimated position in comparison to a map using the collected visual information, thereby estimating a precise position with an error within 1 meter (m).

When the image data acquired from the camera 203 is reliable, the processor 220 re-estimates the position of the target using the IMU signal, the GPS signal, and the image data. For example, the processor 220 performs Kalman filtering or nonlinear filtering, such as, particle filtering on the acquired sensing data. Other sensor fusion technique may be used without departing from the spirit and scope of the illustrative examples described. Kalman filtering is a sensor fusion technique and is a filtering technique that minimizes a root mean square error (RMSE) of an error of a state variable to be estimated. When the processor 220 processes a measured value, for example, the image data having a nonlinearity acquired from an auxiliary sensor, such as a camera, to estimate a position of a target, an error may occur due to the nonlinearity. The processor 220 uses a nonlinear sensor to process the image data, thereby minimizing the error occurring due to the nonlinearity.

The processor 220 estimates the position of the target by fusing sensing data at an optimized ratio based on a performance for each sensor through the Kalman filtering or the nonlinear filtering. When any of the sensors are vulnerable to a change in external environment, incorrect sensing data may be collected in the processor 220. When the Kalman filtering is performed on the incorrect sensing data, an error corresponding to a fault measured value may occur and thus, the accuracy on the position estimation may decrease. To increase the accuracy and to maintain the reliability of the position estimation, in an example, the position estimating apparatus 200 selectively uses the auxiliary sensor 212 having a lower reliability and a higher accuracy in comparison to the main sensor 211.

In an example, the processor 220 uses at least two filtering techniques rather than one Kalman filtering. In an example, the processor 220 applies the different filtering techniques to different levels, independently. Thus, the processor 220 minimizes the effect of a faulty auxiliary sensor 212 on the position estimation performed based on the main sensor 211. In an example, when the auxiliary sensor 212 is unreliable, the processor 220 estimates a position based on the main sensing data excluding unreliable auxiliary sensing data from position estimation during a current time interval and a subsequent time interval. In an example, when the auxiliary sensor 212 is reliable, the processor 220 re-estimates the position based on the main sensing data and the auxiliary sensing data.

In an example, the processor 220 outputs the position to a display 230. In an example, the position estimating apparatus 200 displays the position of the vehicle on a windshield glass of the vehicle through a head-up display (HUD). However, the displaying of the position is not limited to the example described in the forgoing, and any other instrument cluster, vehicular infotainment system, screen in the vehicle that uses augmented reality, or display panel in the vehicle may perform the display function. Other displays, such as, for example, smart phone and eye glass display (EGD) that are operatively connected to the position estimating apparatus 200 may be used without departing from the spirit and scope of the illustrative examples described. In another example, the processor 220 outputs the position through an audio signal.

FIG. 3 is a diagram illustrating an example of a position estimating apparatus 300. The position estimating apparatus 300 may include a sensor 310, a processor 320, and a memory 330.

The sensor 310 includes a main sensor 311, an auxiliary sensor 312, and an additional sensor 313.

The main sensor 311 generates main sensing data. The main sensor 311 includes, for example, an IMU and a GPS module. The GPS module measures an absolute position at 1 hertz (Hz) and operates stably because it has low noise. The IMU measures a relative position at 100 Hz and can measure at a high velocity.

The auxiliary sensor 312 generates auxiliary sensing data. The auxiliary sensor 312 includes, for example, a camera. The camera measures a relative path at a frequency between 1 and 10 Hz or measures an absolute position through map matching. In the camera, a lower drift may occur in comparison to the IMU.

The additional sensor 313 generates additional sensing data. In an example, the additional sensor 313 includes an odometer, a light detection and ranging (LIDAR) module, and a radio detection and ranging (RADAR) module.

In an example, the processor 320 estimates a position of a target based on the main sensing data acquired from the main sensor 311. The processor 320 determines whether to apply the auxiliary sensing data acquired from the auxiliary sensor 312 and the additional sensing data acquired from the additional sensor 313 to position estimation based on reliabilities of the auxiliary sensing data and the additional sensing data. For example, the main sensor 311 including the GPS module may operate effectively in an area no obstacle blocking the GPS signal is present. In an example, the auxiliary sensor 312 including the camera may be disrupted by an ambient brightness and a characteristic of an object. In an example, to prevent the error due to a sensor malfunctioning, the processor 320 hierarchically applies sensing data to the position estimation. Further description of the position estimation performed based on the auxiliary sensing data and the additional sensing data is described below.

The memory 330 temporarily or permanently stores data needed for position estimation. In an example, the memory 330 time-sequentially stores the main sensing data acquired from the main sensor 311, the auxiliary sensing data acquired from the auxiliary sensor 312, and the additional sensing data acquired from the additional sensor 313. In an example, the memory 330 stores a map of an area including a region at which a target is located and a scene image, for example, a 360-degree panoramic image captured at each point on the map.

By fusing the main sensing data and the auxiliary sensing data, the position estimating apparatus 300 precisely estimates a position of a vehicle in a lane unit.

Figure 4:
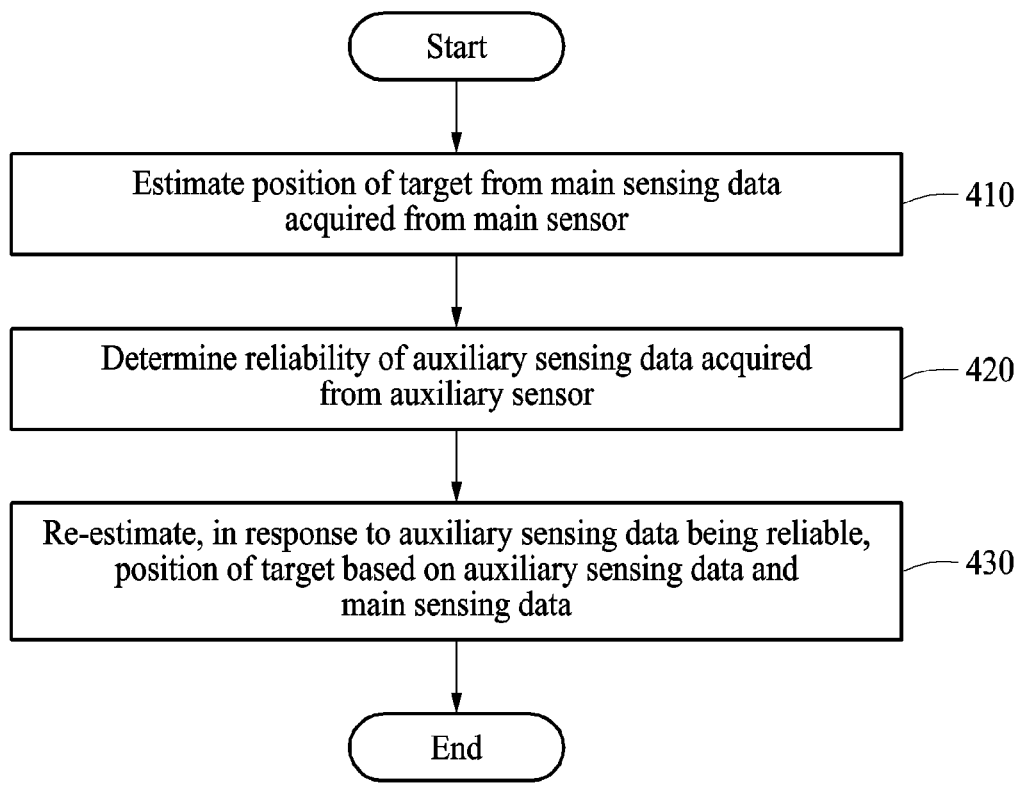
FIG. 4 illustrates an example of a position estimating method.

FIG. 4 illustrates an example of a position estimating method. The operations in FIG. 4 may be performed in the sequence and manner as shown, although the order of some of the operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

In operation 410, a processor of a position estimating apparatus estimates a position of a target from main sensing data acquired from a main sensor. The processor estimates the position of the target by performing, for example, nonlinear filtering on the main sensing data.

In operation 420, the processor determines a reliability of auxiliary sensing data acquired from an auxiliary sensor. In an example, the processor acquires image data corresponding to a front view of the target from the auxiliary sensor. The processor determines a reliability of the image data. The processor calculates a reliability score of the auxiliary sensing data and determines a reliability of the auxiliary sensing data based on the calculated reliability score.

In operation 430, the processor re-estimates the position of the target based on the auxiliary sensing data and the main sensing data when the auxiliary sensing data is reliable. In an example, the processor excludes the position estimated in operation 410 and re-estimates a new position by performing nonlinear filtering on the auxiliary sensing data and the main sensing data.

Also, when the auxiliary sensing data is determined to be unreliable, the processor determines the position of the target estimated based on the main sensing data to be a position of the target. In this example, the processor excludes a position re-estimating operation performed based on the auxiliary sensing data and the main sensing data.

Figure 5:
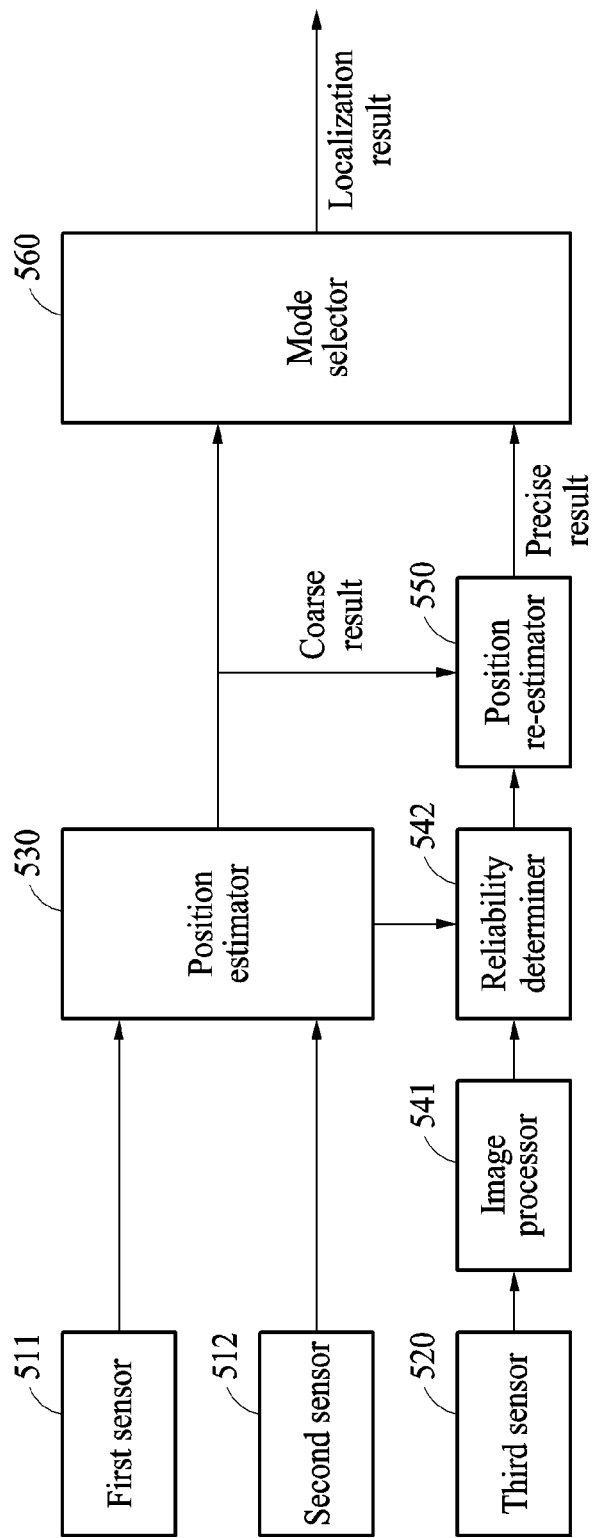
FIGS. 5 through 6B illustrate examples of apparatuses and processes for position estimating.
Figure 6A:
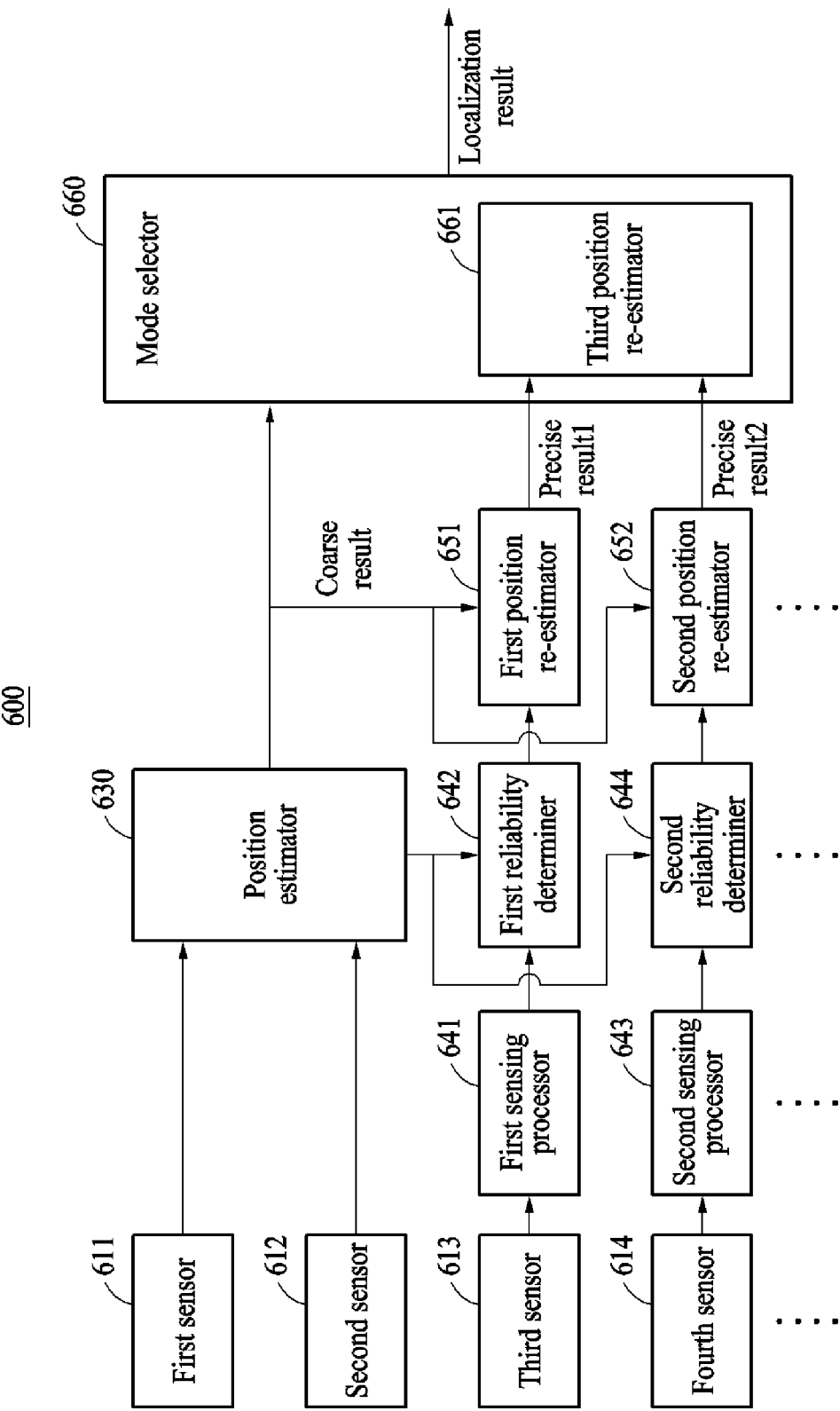
Figure 6B:
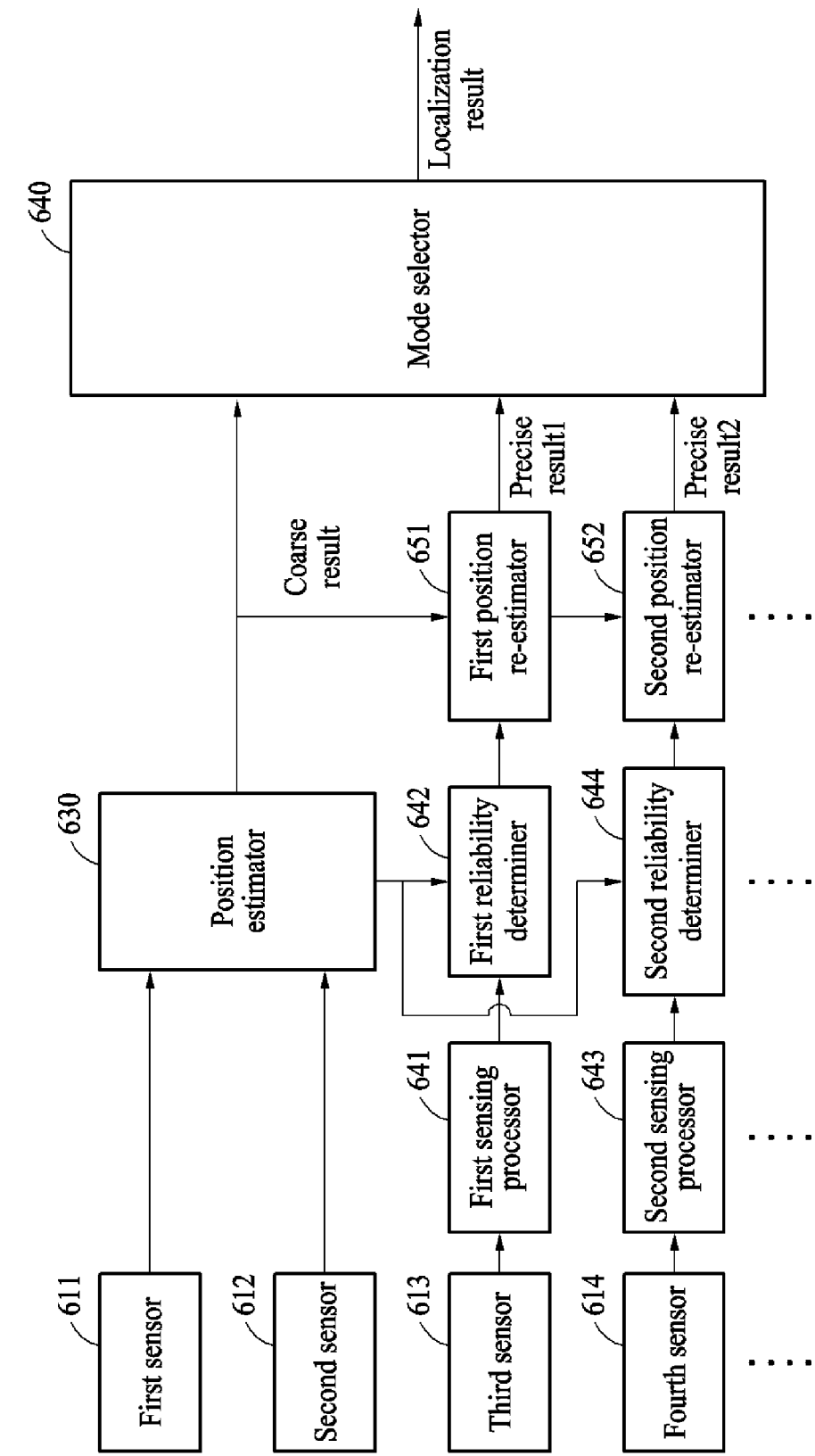

FIGS. 5, 6A, and 6B illustrate examples of apparatuses and processes of estimating a position.

FIG. 5 illustrates a process of determining a position of a target in a processor of a position estimating apparatus based on main sensing data and auxiliary sensing data. The position estimating apparatus performs, for example, two-level positioning. As illustrated in FIG. 5, the position estimating apparatus 500 includes a first sensor 511, a second sensor 512, a third sensor 520, a position estimator 530, an image processor 541, a reliability determiner 542, a position re-estimator 550, and a mode selector 560.

The first sensor 511 acquires first sensing data, for example, a GPS signal. The second sensor 512 acquires second sensing data, for example, an IMU signal. The position estimator 530 estimates a position based on the first sensing data and the second sensing data. The position estimator 530 estimates the position of the target by applying Kalman filtering or nonlinear filtering, for example, an extended Kalman filter to main sensing data, for example, the GPS signal and the IMU signal. However, the main sensing data is not limited to the GPS signal and the IMU signal. Other types of sensing data such as, for example, vehicle velocity meter information, may be used without departing from the spirit and scope of the illustrative examples described. An error in the GPS signal may be about 10 m and the error may increase in a downtown area or a tunnel. Thus, the position estimated based on the GPS signal and the IMU signal may be a coarse positioning result.

In an example, the image processor 541 acquires third sensing data, for example, image data from the third sensor 520, for example, a camera to perform image processing. The third sensor 520 acquires image data that is visual information surroundings the target. The image processor 541 performs the image processing on the image data to convert the image data into information to be used for positioning.

The reliability determiner 542 determines a reliability of the image data based on a result of the image processing. The third sensor 520 may acquire false data due to an ambient brightness and an object placed near the target. By determining the reliability of the image data, the reliability determiner 542 is prevented from using false image data.

The reliability determiner 542 determines a reliability of auxiliary sensing data based on the main sensing data. In an example, the reliability determiner 542 calculates a difference between velocity information obtained from the main sensing data and velocity information obtained from the auxiliary sensing data. The reliability determiner 542 calculates a first velocity of the target based on any one or any combination of the vehicle velocity meter information, the GPS signal, and the IMU signal corresponding to the main sensing data. The reliability determiner 542 calculates a second velocity of the target from the image data corresponding to the auxiliary sensing data based on a visual odometry. The reliability determiner 542 determines that the auxiliary sensing data is unreliable when a difference between the first velocity and the second velocity is greater than a threshold. The reliability determiner 542 determines that the auxiliary sensing data is reliable when the difference between the first velocity and the second velocity is less than or equal to the threshold.

The present examples are not to be taken as being limited thereto. In another example, the reliability determiner 542 determines the reliability of the auxiliary sensing data based on all data. The reliability determiner 542 calculates any one or any combination of a difference between position information obtained from the main sensing data and position information obtained from the auxiliary sensing data, a difference between velocity information obtained from the main sensing data and velocity information obtained from the auxiliary sensing data, and a difference between attitude information obtained from the main sensing data and attitude information obtained from the auxiliary sensing data. The reliability determiner 542 determines the reliability of the auxiliary sensing data based on any one or any combination of the aforementioned differences.

In an example, the reliability determiner 542 determines whether the difference between the position information is greater than a first threshold, whether the difference between the velocity information is greater than a second threshold, and whether the difference between the attitude information is greater than a third threshold. In an example, when any one or any combination of the difference between the position information, the difference between the velocity information, and the difference between the attitude information is lesser than the corresponding threshold, the reliability determiner 542 determines that the auxiliary sensing data is reliable. When each of the differences is greater than or equal to the corresponding threshold, the reliability determiner 542 determines that the auxiliary sensing data is unreliable.

In an example, the reliability determiner 542 calculates a reliability score based on any one or any combination of the difference between the position information, the difference between the velocity information, and the difference between the attitude information. When the reliability score is greater than a threshold score, the reliability determiner 542 determines that the auxiliary sensing data is reliable. When the reliability score is less than or equal to the threshold score, the reliability determiner 542 determines that the auxiliary sensing data is unreliable.

When the reliability determiner 542 determines that the auxiliary sensing data is reliable, the position re-estimator 550 calculates a precise positioning result. The position re-estimator 550 re-estimates the position of the target based on a coarse positioning result and the auxiliary sensing data. The position re-estimator 550 determines the position of the target precisely with an error in a lane unit, for example, 1 m.

The mode selector 560 selects an output mode for the position of the target based on the reliability of the auxiliary sensing data. When the auxiliary sensing data is determined to be unreliable, the mode selector 560 selects a coarse positioning mode. When an auxiliary represents a reliability score less than or equal to the threshold score, the mode selector 560 selects the coarse positioning mode. When the auxiliary sensing data is determined to be reliable, the mode selector 560 selects a finite positioning mode. When an auxiliary sensor represents a reliability score greater than the threshold score, the mode selector 560 selects the finite positioning mode.

When the coarse positioning mode is selected, the mode selector 560 outputs the position estimated based on the main sensing data as the coarse positioning result. When auxiliary sensing data collected during a current time interval is unreliable, the position estimating apparatus excludes the auxiliary sensing data during the current time interval. For example, the position estimating apparatus excludes the unreliable auxiliary sensing data from positioning performed during the current time interval to ensure a stability of the positioning.

When the finite positioning mode is selected, the mode selector 560 outputs the position re-estimated based on the main sensing data and the auxiliary sensing data as the precise positioning result. For example, the mode selector 560 outputs the position re-estimated based on the main sensing data and the auxiliary sensing data as the precise positioning result to ensure accuracy on positioning performed during the current time interval.

The position estimating apparatus calculates a reliability of the precise positioning result in real time. When at least a level of high reliability is maintained constantly, the position estimating apparatus applies the precise positioning result to position estimation of a subsequent time interval. For example, when the auxiliary sensor represents a reliability score greater than the threshold score for a threshold period of time, the position estimating apparatus estimates the position of the target based on a position calculated in a previous time interval and the main sensing data. Here, a time interval indicates an interval set based on a period for updating the position of the target.

As discussed above, the position estimating apparatus applies the precise positioning result of the current time interval to the positioning of the subsequent time interval only when the auxiliary sensing data has the high reliability score for at least the threshold period of time. Through this, the position estimating apparatus enhances accuracy of a coarse positioning result in the subsequent time interval.

When a high reliability score is not maintained for a long-term period, the position estimating apparatus does not provide the precise positioning result of the current time interval to the positioning of the subsequent time interval as a feedback. Thus, the position estimating apparatus prevents the camera malfunctioning from affecting the coarse positioning result of the subsequent time interval.

FIG. 6A illustrates a process of determining a position in a position estimating apparatus including an additional sensor in addition to a main sensor and an auxiliary sensor.

Referring to FIG. 6A, a position estimating apparatus 600 includes a first sensor 611, a second sensor 612, a third sensor 613, a fourth sensor 614, a position estimator 630, a first sensing processor 641, a first reliability determiner 642, a second sensing processor 643, a second reliability determiner 644, a first position re-estimator 651, a second position re-estimator 652, a third position re-estimator 661, and a mode selector 660. In an example, the first sensor 611 and the second sensor 612 correspond to main sensors, and the third sensor 613 and a fourth sensor 614 correspond to auxiliary sensors. The position estimating apparatus 600 may perform 2-level positioning.

The position estimator 630 estimates a coarse position of a target based on the first sensor 611 and the second sensor 612. The first sensing processor 641 acquires sensing data from the third sensor 613 and converts the sensing data into information to be used for positioning. The second sensing processor 643 acquires sensing data from the fourth sensor 614 and converts the sensing data into information to be used for positioning.

The position estimating apparatus determines a reliability of the sensing data of the third sensor 613 and a reliability of the sensing data of the fourth sensor 614. For example, the first reliability determiner 642 determines the reliability of the sensing data acquired from the third sensor 613, and the second reliability determiner 644 determines the reliability of the sensing data acquired from the fourth sensor 614.

When the sensing data of the third sensor 613 is reliable, the first position re-estimator 651 re-estimates a precise position, for example, a precise result 1 of the target based on the coarse position and the sensing data of the third sensor 613.

When the sensing data of the fourth sensor 614 is reliable, the second position re-estimator 652 re-estimates a precise position, for example, a precise result 2 of the target based on the coarse position and the sensing data of the fourth sensor 614.

In an example, the third position re-estimator 661 determines a precise position of the target by fusing the precise position re-estimated by the first position re-estimator 651 and the precise position re-estimated by the second position re-estimator 652. For example, the third position re-estimator 661 determines the precise position of the target by applying Kalman filtering to the precise position re-estimated by the first position re-estimator 651 and the precise position re-estimated by the second position re-estimator 652.

The mode selector 660 determines a mode based on a result of determination of the reliability. For example, when the sensing data of the third sensor 613 and the sensing data of the fourth sensor 614 are determined to be reliable, the mode selector 660 selects a finite positioning mode and output the precise position determined by the third position re-estimator 661. When both of the sensing data of the third sensor 613 and the sensing data of the fourth sensor 614 are unreliable, the mode selector 660 selects a coarse positioning mode and a position estimated based on sensing data of the first sensor 611 and sensing data of the second sensor 612 as a coarse positioning result. The mode selector 660 outputs a positioning result corresponding to a selected mode as a localization result.

The present examples are not to be taken as being limited thereto. The position estimating apparatus may also perform 3-level positioning in an order from main sensing data, auxiliary sensing data, and additional sensing data. Further details on the 3-level positioning will be described with reference to FIG. 6B.

FIG. 6B illustrates a position estimating apparatus 601 performing a 3-level positioning based on a similar structure to a structure of the position estimating apparatus 600 of FIG. 6A.

In the example illustrated in FIG. 6B, the first sensor 611, the second sensor 612, the third sensor 613, the fourth sensor 614, the position estimator 630, the first sensing processor 641, the first reliability determiner 642, the second sensing processor 643, the second reliability determiner 644, and the first position re-estimator 651 may operate similarly or identically as described with reference to FIG. 6A.

In an example of FIG. 6B, when sensing data acquired from the fourth sensor 614 is reliable, the second position re-estimator 652 re-estimates a position of a target based on sensing data acquired from the fourth sensor 614 and a position re-estimated by the first position re-estimator 651.

A mode selector 640 determines a mode based on a result of determination of the reliability. When the sensing data acquired from the third sensor 613 is unreliable, the mode selector 640 selects a primary positioning mode and outputs a coarse positioning result. When the sensing data acquired from the third sensor 613 is reliable and the sensing data acquired from the fourth sensor 614 is unreliable, the mode selector 640 selects a secondary positioning mode and outputs a primary precise positioning result, for example, a precise result 1. When the sensing data acquired from the third sensor 613 and the sensing data acquired from the fourth sensor 614 are reliable, the mode selector 640 selects a tertiary positioning mode and outputs a secondary precise positioning result, for example, a precise result 2. The mode selector 660 outputs a positioning result corresponding to a selected mode as a localization result.

FIG. 6B illustrates the 3-level positioning as an example, but is not limited thereto. The position estimating apparatus may assign n-level priorities to sensors to perform n-level positioning, n being an integer greater than or equal to 2.

Figure 7:
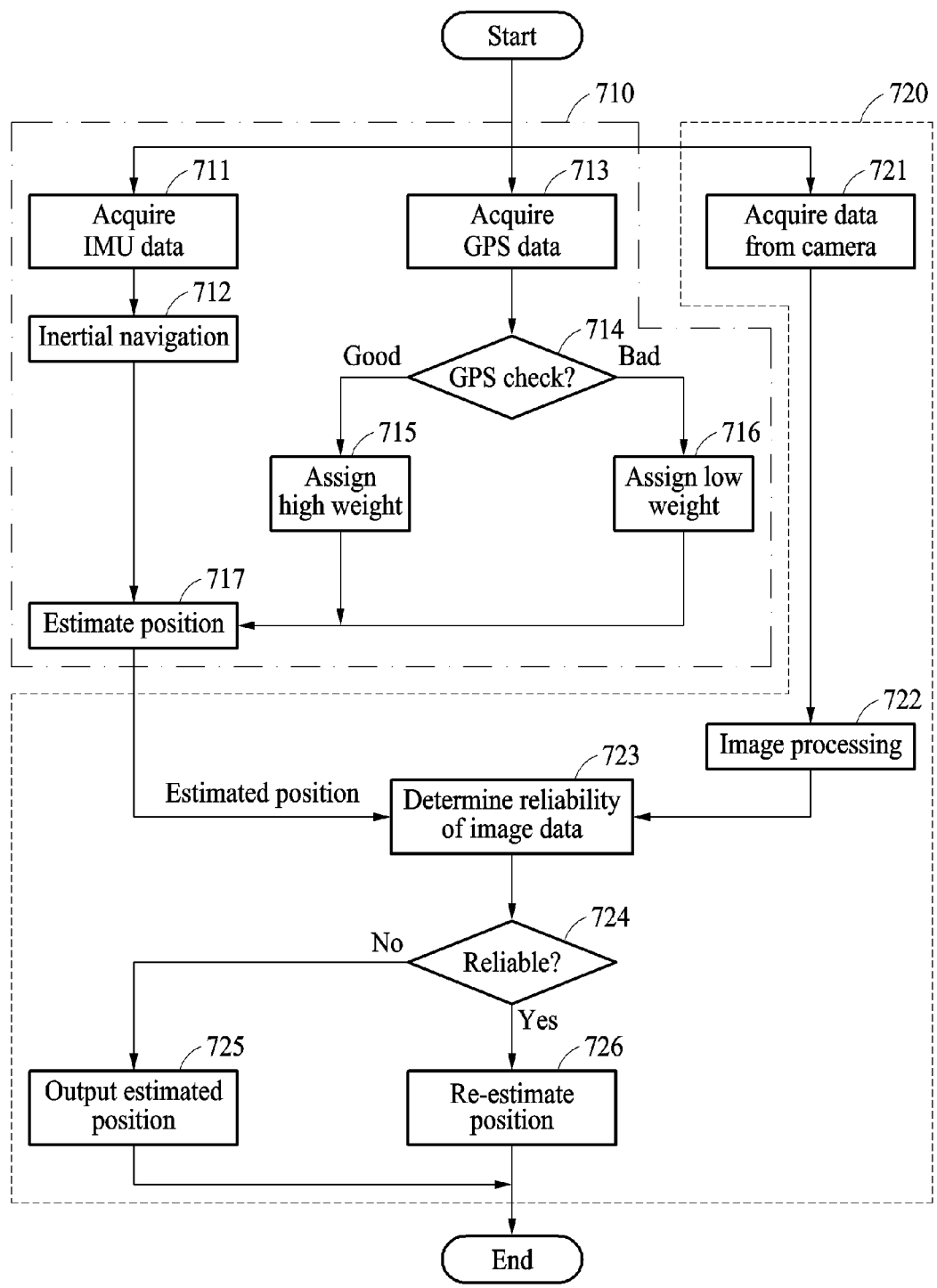
FIGS. 7 through 9 illustrate examples of a position estimating method.
Figure 8:
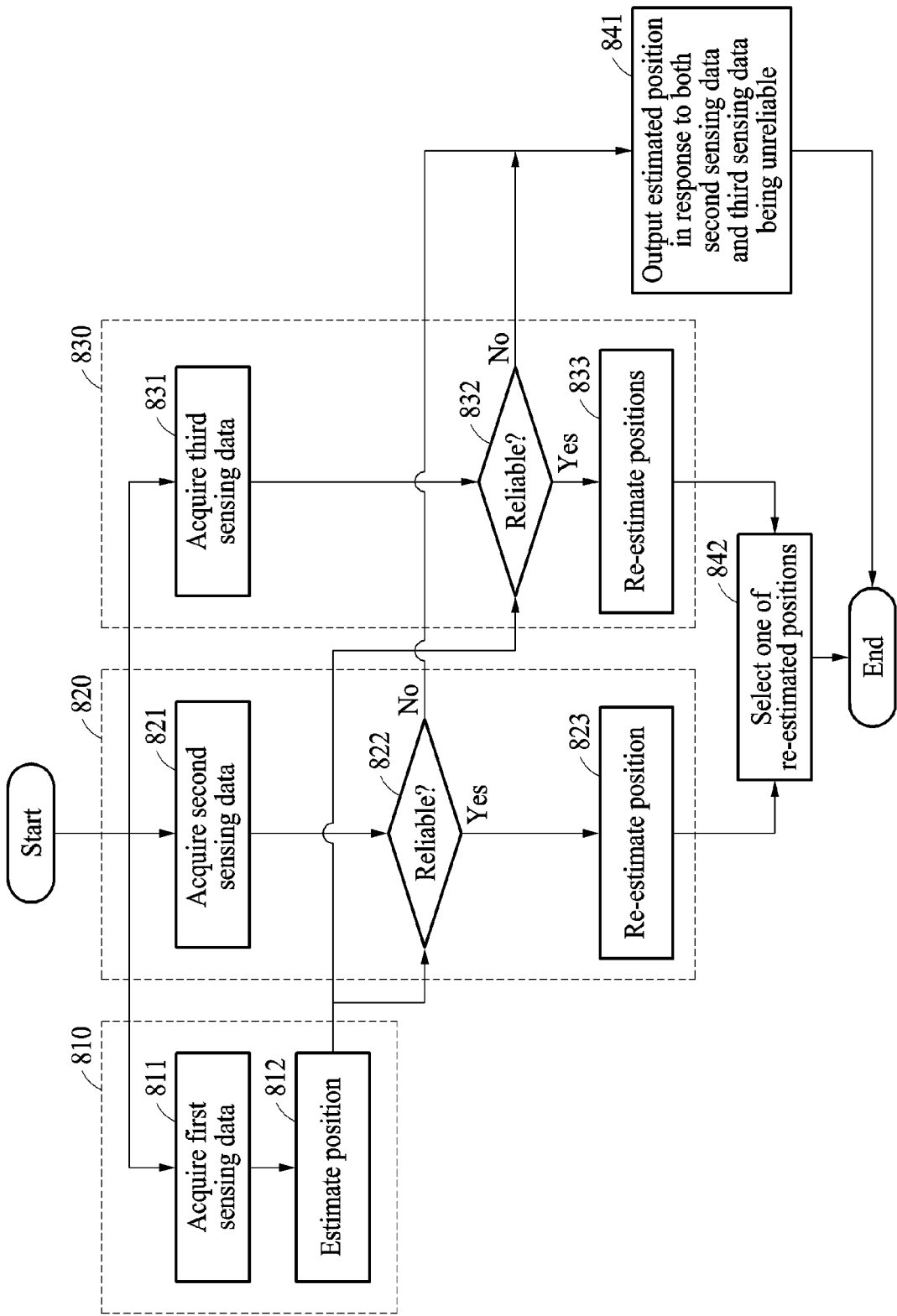
Figure 9:
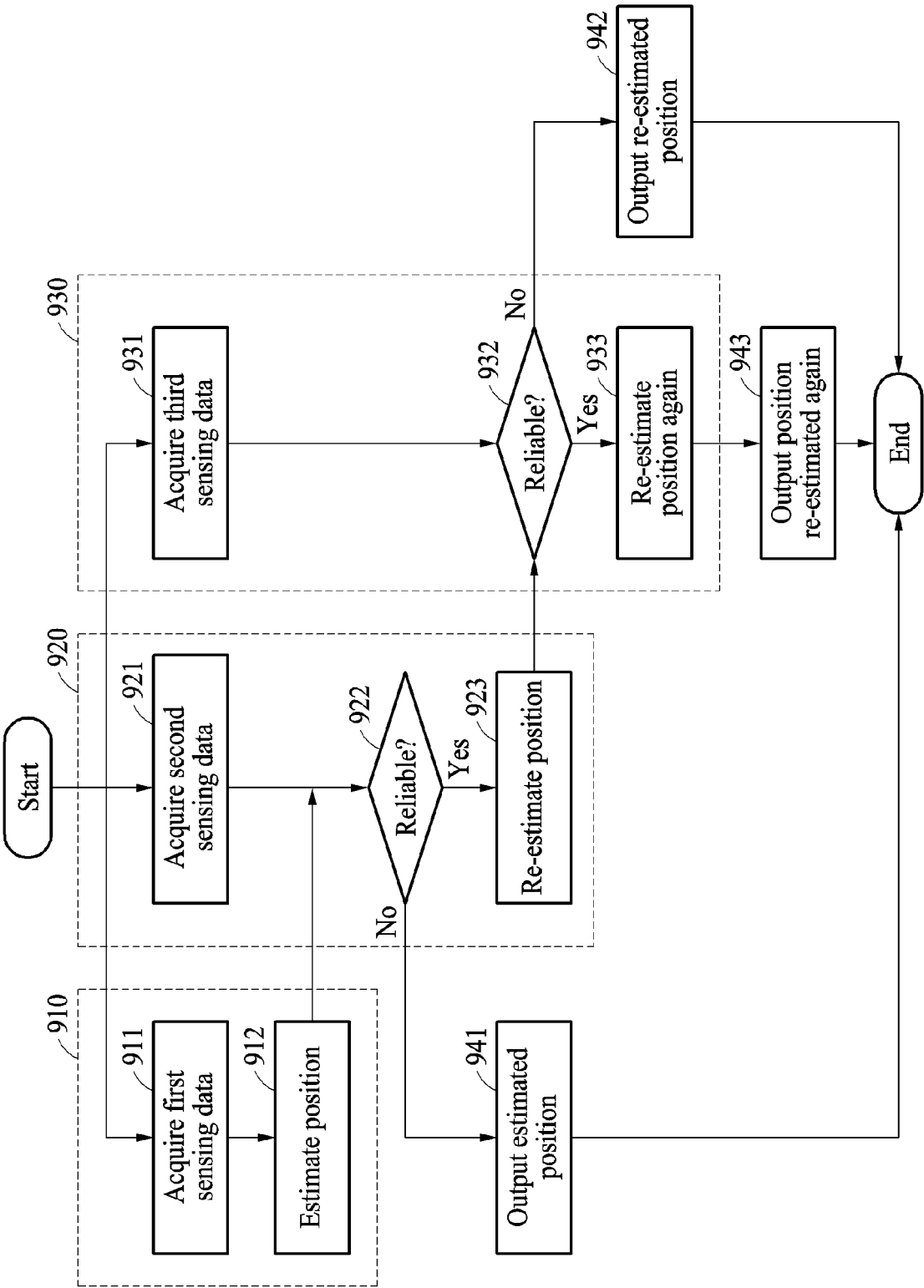

FIGS. 7 through 9 illustrate examples of a position estimating method.

FIG. 7 is a diagram illustrating an example of positioning using a main sensor and an auxiliary sensor. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6B are also applicable to FIG. 7, and are incorporated herein by reference. Thus, the above description may not be repeated here.

Referring to FIG. 7, a position estimating apparatus coarsely estimates a position in a first estimation 710 and precisely re-estimates a position based on a reliability of auxiliary sensing data in a second estimation 720. In an example, the first estimation 710 is independently performed such that it is not affected by a result of the second estimation 720. In an example, a processor assigns a higher priority to the first estimation 710 in comparison to the second estimation 720.

In operation 711, the position estimating apparatus acquires IMU data. The IMU data is data acquired from an IMU, such as, for example, acceleration and angular velocity signals. In operation 712, the position estimating apparatus applies an inertial navigation to the acceleration and angular velocity signals to calculate a position of a target. The inertial navigation may be, for example, a positioning scheme that updates a position, a velocity, and an attitude of a time based on a position, a velocity, and an attitude of a previous time using acceleration and angular velocity signals obtained from an IMU.

In operation 713, the position estimating apparatus acquires GPS data. The GPS data is data acquired from a GPS module and, for example, a GPS signal. In operation 714, the position estimation apparatus verifies, for example, checks integrity of the GPS signal. In operation 715, when a performance of a GPS position estimation result is relatively high, the position estimating apparatus assigns a high weight to the GPS signal. In operation 716, when a performance of a GPS position estimation result is relatively low, the position estimating apparatus assigns a low weight to the GPS signal. The performance of the GPS position estimation result indicates, for example, a probability of the GPS position estimation being true.

In operation 717, the position estimating apparatus estimates a position of a target based on the IMU signal to which the inertial navigation is applied and the GPS signal to which a weight is assigned. The position estimating apparatus estimates the position of the target by performing nonlinear filtering on the IMU signal and the GPS signal.

In operation 721, the position estimating apparatus acquires data, for example, an image from a camera. The processor of the position estimating apparatus receives image data from the camera.

In operation 722, the position estimating apparatus performs image processing on the image data to convert the image data into a form suitable for positioning.

In operation 723, the position estimating apparatus determines a reliability of the image data. The position estimating apparatus calculates a reliability score of the image data and determines the reliability of the image data based on the calculated reliability score. In an example, a difference between velocity information obtained from the main sensing data and velocity information obtained from the auxiliary sensing data is used as a reliability score corresponding to a reference for determining reliability.

In operation 724, when the reliability score of the image data is greater than a threshold, the position estimating apparatus determines that the auxiliary sensing data, for example, the image data is reliable. When the reliability score of the auxiliary sensing data is less than or equal to the threshold, the position estimating apparatus determines that the auxiliary sensing data is unreliable.

In operation 725, when the image data is unreliable, the position estimating apparatus outputs the position estimated in operation 717. A camera may acquire incorrect data due to an ambient brightness or an object placement, and even in such circumstances, the position estimating apparatus may output a coarse positioning result to maintain a stability of positioning. Since the position estimating apparatus does not feedback a precisely re-estimated result in a current time interval, the position estimating apparatus may output a positioning result that is robust, if the camera fault detection is delayed or impossible.

For example, it may be difficult for the GPS module to receive a signal in an obstructed area, such as a downtown area or a tunnel. In this example, the position estimating apparatus assigns a low weight to the GPS signal in operation 716. Thus, in operation 717, the position estimating apparatus estimates a coarse position dominantly based on the IMU signal acquired by IMU rather than the GPS signal. In an inertial navigation based on the IMU signal, an error may occur due to an error drift characteristic. When the image data is reliable, in operation 726, the position estimating apparatus re-estimates a position of the target based on the image data and the IMU signal, thereby enhancing a preciseness of positioning. Also, when the image data is unreliable, to maintain the stability of positioning, the position estimating apparatus outputs the position of the target estimated based on the IMU signal in operation 725.

FIG. 8 is a diagram illustrating a method of determining a position of a target in a position estimating apparatus based on first sensing data, second sensing data, and third sensing data. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

The first sensing data corresponds to main sensing data acquired from a main sensor. The second sensing data and the third sensing data correspond to auxiliary sensing data acquired from auxiliary sensors.

A position estimating apparatus coarsely estimates a position in a first estimation 810. The position estimating apparatus precisely re-estimates the coarsely estimated position based on reliabilities of the second sensing data and the third sensing data in a second estimation 820 and a third estimation 830, respectively.

The position estimating apparatus calculates a reliability score of the auxiliary sensing data, for example, the second sensing data and the third sensing data acquired from each of the plurality of auxiliary sensors. The position estimating apparatus re-estimates a position of a target based on the main sensing data and auxiliary sensing data acquired from an auxiliary sensor associated with a highest reliability score among the plurality of auxiliary sensors. A process of estimating a position of the target based on the main sensing data and auxiliary sensing data acquired from an auxiliary sensor associated with a highest reliability score among the plurality of auxiliary sensors is further described below.

In operation 811, the position estimating apparatus acquires the first sensing data. The position estimating apparatus receives a GPS signal and an IMU signal as the first sensing data. In operation 812, the position estimating apparatus estimates a position of a target based on the first sensing data.

In operation 821, the position estimating apparatus acquires the second sensing data. In an example, the position estimating apparatus receives image data as the second sensing data. In operation 822, the position estimating apparatus determines a reliability of the second sensing data. In operation 823, when the second sensing data is determined to be reliable, the position estimating apparatus re-estimates the position of the target based on the first sensing data and the second sensing data.

In operation 831, the position estimating apparatus acquires the third sensing data. In an example, the position estimating apparatus receives a LIDAR signal as the third sensing data. In operation 832, the position estimating apparatus determines a reliability of the third sensing data. In operation 833, when the third sensing data is determined to be reliable, the position estimating apparatus re-estimates positions of the target based on the first sensing data and the third sensing data.

In operation 842, the position estimating apparatus selects one of the re-estimated positions. The position estimating apparatus calculates reliability scores of the second sensing data and the third sensing data. The position estimating apparatus selects a position re-estimated in association with sensing data having a higher reliability score between the second sensing data and the third sensing data. Although FIG. 8 illustrates the second sensing data and the third sensing data as auxiliary sensing data, a number of pieces of auxiliary sensing data is not limited thereto. The position estimating apparatus may acquire more or less than two pieces of auxiliary sensing data.

In operation 841, when both the second sensing data and the third sensing data are unreliable, the position estimating apparatus outputs the position estimated in operation 812.

When either the second sensing data or the third sensing data is reliable, the position estimating apparatus outputs a position re-estimated based on reliable sensing data.

Although FIG. 8 illustrates that the first sensing data through the third sensing data are used for positioning, the position estimating apparatus may use the first sensing data through $n^{th}$ sensing data. In this example, the position estimating apparatus may assign a highest priority to the first sensing data and assign, to the second sensing data through the $n^{th}$ sensing data, a priority that is lower than the priority assigned to the first sensing data. In an example, the priority assigned to the second sensing data through the $n^{th}$ sensing data may be the same.

FIG. 9 is a diagram illustrating an example of a method of determining a position of a target in a position estimating apparatus based on first sensing data, second sensing data, and third sensing data. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

In an example, the first sensing data corresponds to main sensing data acquired from a main sensor, the second sensing data corresponds to auxiliary sensing data acquired from an auxiliary sensor, and the third sensing data corresponds to additional sensing data acquired from an additional sensor.

A position estimating apparatus coarsely estimates a position in a first estimation 910. The position estimating apparatus precisely re-estimates the coarsely estimated position based on a reliability of the second sensing data in a second estimation 920. The position estimating apparatus more precisely re-estimates the position again based on a reliability of the third sensing data in a third estimation 930. In an example, the position estimating apparatus assigns a highest priority to the first estimation 910. In an example, the position estimating apparatus assigns a priority lower than the priority of the first estimation 910, to the second estimation 920. In an example, the position estimating apparatus assigns a priority lower than the priority of the second estimation 920, to the third estimation 930. Thus, the position estimating apparatus prevents errors in the second estimation 920 and the third estimation 930 from being propagated to the first estimation 910.

In operation 911, the position estimating apparatus acquires the first sensing data. In operation 912, the position estimating apparatus estimates a position of a target based on the first sensing data.

In operation 921, the position estimating apparatus acquires the second sensing data. In operation 922, the position estimating apparatus determines a reliability of the second sensing data. In operation 941, when the second sensing data is unreliable, the position estimating apparatus outputs the position estimated in operation 912. In operation 923, when the second sensing data is reliable, the position estimating apparatus re-estimates the position of the target based on the first sensing data and the second sensing data.

In operation 931, the position estimating apparatus acquires the third sensing data. In operation 932, when the second sensing data is reliable, the position estimating apparatus determines a reliability of the third sensing data, for example, the additional sensing data acquired from the additional sensor. In operation 942, when the third sensing data is unreliable, the position estimating apparatus outputs the position re-estimated in operation 923. In operation 933, when the third sensing data, for example, the additional sensing data is determined to be reliable, the position estimating apparatus re-estimates the position of the target based on the third sensing data, the second sensing data corresponding to the auxiliary sensing data, and the first sensing data corresponding to the main sensing data.

In operation 943, the position estimating apparatus outputs the position re-estimated in operation 933.

Although FIG. 9 illustrates that the first sensing data through the third sensing data are used for positioning, the position estimating apparatus may use the first sensing data through $n^{th}$ sensing data. In this example, the position estimating apparatus may assign a highest priority to the first sensing data and assign gradually decreasing priorities in an order from the second sensing data to the $n^{th}$ sensing data.

Even when an auxiliary sensor or an additional sensor collects fault sensing data due to a defection, a position estimating apparatus outputs an initial estimation result obtained based on main sensing data, thereby preventing decreases in accuracy and a reliability of position estimation.

According to an aspect, disclose is methods and apparatuses for sensor fusion that compensates for weaknesses of different sensors in accordance with characteristics of the sensors.

The position estimating apparatus 500, position estimator 530, image processor 541, reliability determiner 542, position re-estimator 550, mode selector 560, position estimating apparatus 600, position estimator 630, first sensing processor 641, first reliability determiner 642, second sensing processor 643, second reliability determiner 644, first position re-estimator 651, second position re-estimator 652, third position re-estimator 661, mode selector 660, position estimating apparatus 601, mode selector 640, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A position estimating method performed by a processor, the method comprising:
   estimating a position of a target based on main sensing data acquired from a main sensor;
   calculating a difference between information obtained from the main sensing data and information obtained from auxiliary sensing data acquired from an auxiliary sensor;
   calculating a reliability score of the auxiliary sensing databased on the calculated difference;
   determining the auxiliary sensing data to be reliable in response to the calculated reliability score being greater than a threshold score; and
   determining the position of the target based on the main sensing data and the auxiliary sensing data, in response to determining the auxiliary sensing data to be reliable,
   wherein the auxiliary sensor has a lower reliability and a higher accuracy in comparison to the main sensor.

2. The position estimating method of claim 1, wherein the estimating of the position of the target comprises:
   applying a nonlinear filtering on the main sensing data to compensate for a positioning error.

3. The position estimating method of claim 1, further comprising:
   acquiring a global positioning system (GPS) signal and an inertial measurement unit (IMU) signal indicating an acceleration and an angular velocity of a target as the main sensing data.

4. The position estimating method of claim 1, further comprising:
   determining the position of the target to be the position of the target estimated based on the main sensing data, in response to determining the auxiliary sensing data to be unreliable.

5. The position estimating method of claim 1, wherein:
   the auxiliary sensing data includes image data in front of the target acquired from the auxiliary sensor; and
   the calculating of the reliability score of the auxiliary sensing data comprises determining a reliability of the image data.

6. The position estimating method of claim 1, further comprising:
   excluding auxiliary sensing data during a current time interval, in response to the auxiliary sensing data collected during the current time interval being determined to be unreliable.

7. The position estimating method of claim 1, further comprising:
   determining the auxiliary sensing data to be unreliable in response to the calculated reliability score being less than or equal to the threshold score.

8. The position estimating method of claim 1, wherein:
   the calculating of the difference comprises calculating any one or any combination of a difference between position information obtained from the main sensing data and position information obtained from the auxiliary sensing data, a difference between velocity information obtained from the main sensing data and velocity information obtained from the auxiliary sensing data, and a difference between attitude information obtained from the main sensing data and attitude information obtained from the auxiliary sensing data; and
   the calculating of the reliability score comprises calculating the reliability score of the auxiliary sensing data based on any one or any combination of the differences.

9. The position estimating method of claim 1:
   further comprising:
      collecting other auxiliary sensing data from a plurality of other auxiliary sensors; and
      calculating a reliability score of each of the other auxiliary sensing data, and
   wherein the determining of the position of the target comprises:
      determining the position of the target based on the main sensing data and the auxiliary sensing data in response to the reliability score of the auxiliary sensing data being a greatest reliability score among the reliability scores of the auxiliary sensing data and the each of the other auxiliary sensing data.

10. The position estimating method of claim 1, further comprising:
    determining an additional sensing data acquired from an additional sensor; and to be reliable,
    wherein the determining of the position of the target comprises determining the position of the target based on the additional sensing data, the auxiliary sensing data, and the main sensing data in response to determining the additional sensing data to be reliable.

11. The position estimating method of claim 1, further comprising:
    selecting an output mode for the position of the target based on the reliability score of the auxiliary sensing data,
    wherein the selecting of the output mode comprises:
    outputting the position estimated based on the main sensing data, in response to the reliability score being less than or equal to the threshold score; and
    outputting the determined position based on the main sensing data and the auxiliary sensing data, in response to the reliability score being greater than the threshold score.

12. A non-transitory computer-readable storage medium storing instructions that, when executed by a processor, cause the processor to perform the position estimating method of claim 1.

13. A position estimating apparatus comprising:
    a main sensor configured to generate main sensing data;
    an auxiliary sensor configured to generate auxiliary sensing data; and
    a processor configured to
    estimate a position of a target based on the main sensing data,
    calculate a difference between information obtained from the main sensing data and information obtained from auxiliary sensing data;
    calculate a reliability score of the auxiliary sensing data based on the calculated difference, determine the auxiliary sensing data to be reliable in response to the calculated reliability score being greater than a threshold score, and
    determine the position of the target based on the main sensing data and the auxiliary sensing data, in response to determining the auxiliary sensing data to be reliable,
    wherein the auxiliary sensor has a lower reliability and a higher accuracy in comparison to the main sensor.

14. The position estimating apparatus of claim 13, wherein the processor is further configured to apply a nonlinear filtering on the main sensing data to compensate for a positioning error.

15. The position estimating apparatus of claim 13, wherein the main sensor comprises:
a sensor configured to acquire a global positioning system (GPS) signal and an inertial measurement unit (IMU) signal indicating an acceleration and an angular velocity of a target as the main sensing data.

16. The position estimating apparatus of claim 13, wherein the processor is further configured to determine the position of the target to be the position of the target estimated based on the main sensing data, in response to determining the auxiliary sensing data to be unreliable.

17. The position estimating apparatus of claim 13, wherein:
the auxiliary sensing data includes image data in front of the target.

18. The position estimating apparatus of claim 13, wherein the processor is further configured to exclude the collected auxiliary sensing data during a current time interval, in response to auxiliary sensing data collected during the current time interval being determined to be unreliable.

19. The position estimating apparatus of claim 13, wherein the processor is further configured to determine that the auxiliary sensing data is unreliable in response to the calculated reliability score being less than or equal to the threshold score.

20. The position estimating apparatus of claim 13, wherein the main sensing data and the auxiliary sensing date are generated from a plurality of sensors, and the processor is further configured to determine the position of the target by fusing sensing data at an optimized ratio based on a performance of each of the plurality of sensors using Kalman filtering.

21. The position estimating apparatus of claim 13, wherein:
the main sensor includes at least one of a global positioning system (GPS) sensor or an inertial measurement unit (IMU) sensor,
the auxiliary sensor includes at least a camera, and
further comprising an additional sensor including at least one of an odometer, a velocity meter, a light detection and ranging (LIDAR) sensor, or a radio detection and ranging (RADAR) sensor.

22. A position estimating apparatus comprising:
a main sensor configured to generate main sensing data;
an auxiliary sensor configured to generate auxiliary sensing data;
a touch-sensitive display;
a memory configured to store instructions; and
a processor configured to execute the instructions to
receive the main sensing data and the auxiliary sensing data,
estimate a position of a target based on the main sensing data,
calculate a difference between information obtained from the main sensing data and information obtained from auxiliary sensing data,
calculate a reliability score of the auxiliary sensing data based on the calculated difference,
determine the auxiliary sensing data to be reliable in response to the calculated reliability score being greater than a threshold score,
determine the position of the target based on the main sensing data and the auxiliary sensing data, in response to determining the auxiliary sensing data to be reliable, and
output the determined position of the target to the display,
wherein the auxiliary sensor has a lower reliability and a higher accuracy in comparison to the main sensor.

* * * * *